Jan. 4, 1938. W. F. BOLDT 2,104,605
POWER TRANSMISSION CONTROL MECHANISM
Filed Aug. 19, 1936 3 Sheets-Sheet 1

INVENTOR.
WERNER F. BOLDT
BY
ATTORNEY

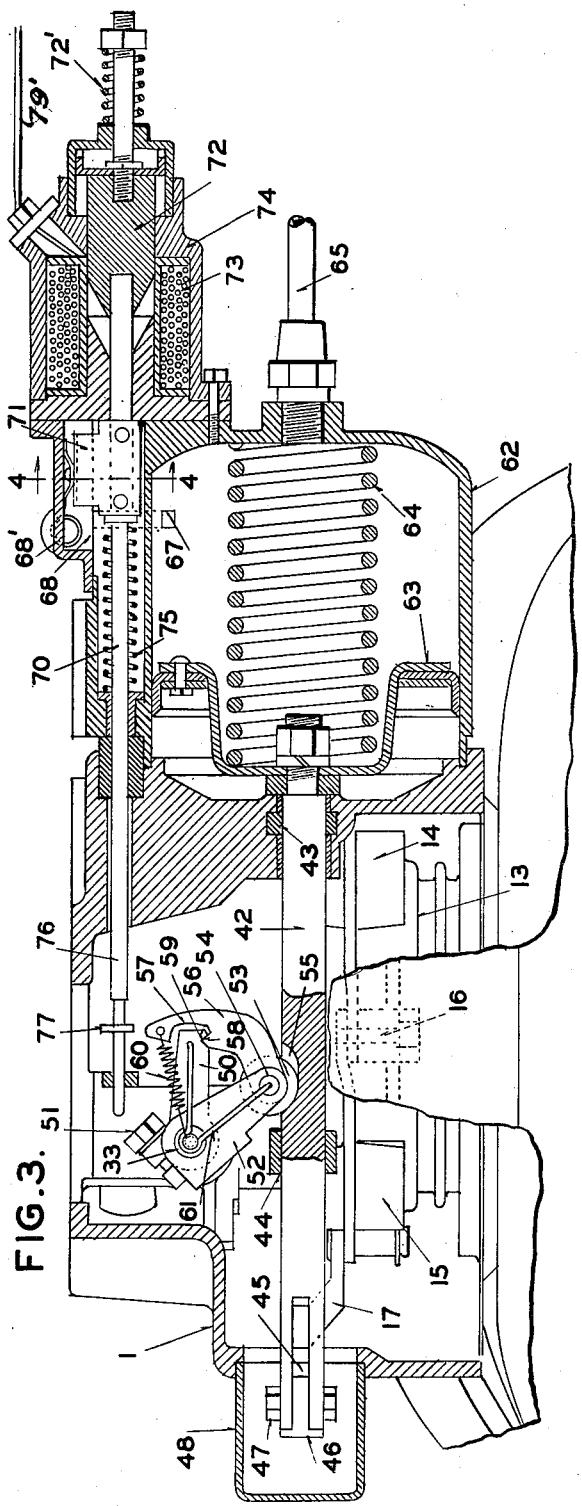

Patented Jan. 4, 1938

2,104,605

UNITED STATES PATENT OFFICE 2,104,605

POWER TRANSMISSION CONTROL MECHANISM

Werner F. Boldt, St. Louis, Mo., assignor to Wagner Electric Corporation, St. Louis, Mo., a corporation of Delaware Application August 19, 1936, Serial No. 96,718

9 Claims. (Cl. 192—12)

My invention relates to power transmission mechanism and more particularly to control means for a transmission mechanism comprising a fluid coupling, a brake, a positive clutch, and a change speed gearing. The invention is in the nature of an improvement in the transmission mechanism shown in application Serial No. 46,515 filed October 24, 1935 in the name myself and George H. Thomas, which became Patent No. 2,076,362.

One of the objects of my invention is to provide a more efficient and compact control mechanism for the brake and the synchronized positive clutch in the type of transmission referred to.

Another object of my invention is to provide a power-operated control means which can be controlled from a remote point and which is so constructed that it will facilitate assembly of the transmission mechanism to the chassis of the vehicle.

Still another object of my invention is to provide a control mechanism in which the timing of the sequence of operations of the brake and the clutch will be positive and uniform under all conditions.

A further object of my invention is to provide an improved brake mechanism which is actuated by a direct pull of the power means of the control mechanism and which brake will be applied with uniform pressure regardless of the wear of the friction element of the brake.

Other objects of my invention will become apparent from the following description taken in connection with the accompanying drawings showing a single embodiment.

Figure 1:
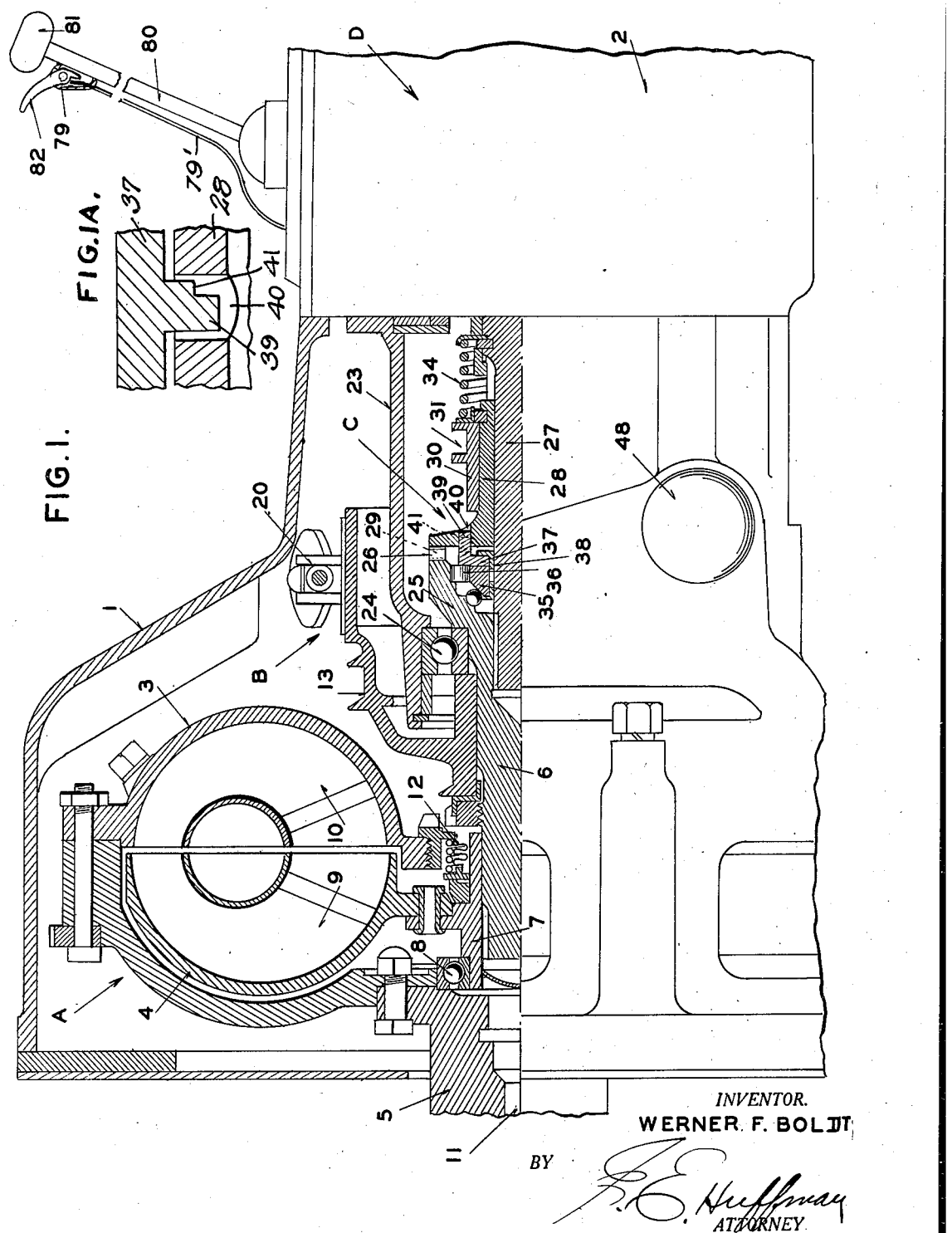
Figure 2:
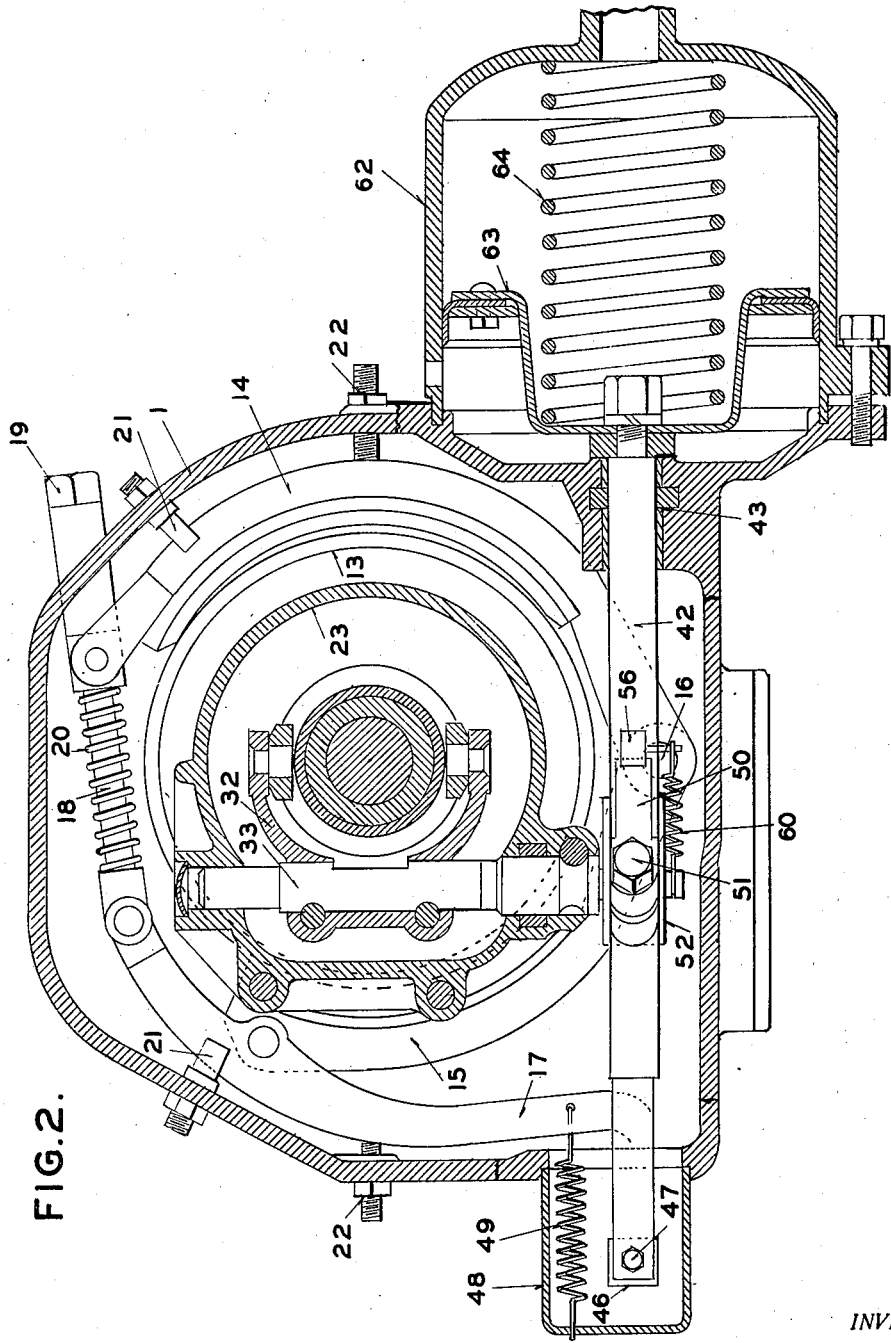

In the drawings Figure 1 is a partial longitudinal cross-sectional view of the transmission mechanism embodying my invention; Figure 1A is a cross-sectional view showing a portion of the balking ring and the manner in which it is associated with the shiftable element of the clutch; Figure 2 is a partial cross-sectional view showing the power-operated control mechanism for operating the clutch and the brake; Figure 3 is a bottom view of the control mechanism, parts being in cross section; Figure 4 is a cross-sectional view taken on the line 4—4 of Figure 3; and Figure 5 is a cross-sectional view taken on the line 5—5 of Figure 4.

Referring to the drawings in detail, the transmission system broadly comprises a fluid coupling A of the Föttinger type having associated therewith a brake B, a synchronized positive clutch C and a change speed gearing D, all connected together, preferably in the sequence named. The fluid coupling A, brake B, and clutch C are all enclosed within a single unitary housing 1 and change speed gearing D is enclosed within a separate housing 2 which is attached directly to housing 1.

The fluid coupling which I employ in my transmission system is of the well-known Föttinger type in which torque is transmitted by the kinetic energy of the circulating fluid and, as shown, this coupling comprises an impeller element 3 and a turbine element 4. The impeller element is directly connected to driving shaft 5 of the prime mover which, in the present instance, is an internal combustion engine, and turbine element 4 is connected to the driven shaft 6 by means of a splined collar 7 which is journaled in driving shaft 5 by means of an annular bearing 8. The impeller element carries a series of blades 10 and the turbine element carries a series of cooperating blades 9, the blades being so spaced as to form an annular liquid circulating chamber having a plurality of passages. This chamber contains a suitable liquid which is supplied thereto through passage 11 in engine shaft 5. In order that the chamber may be efficiently sealed against leakage, a spring biased diaphragm seal 12 is interposed between the impeller element and collar 7 to which the turbine element is secured. This seal permits free relative rotation between the impeller and turbine elements while at the same time prevents leakage.

The operation of the fluid coupling is well known and, therefore, need not be described in detail. When the impeller element is rotated by the engine the liquid in the chamber will be circulated through the passages and power will be transmitted to the turbine element as a result of the kinetic energy of the circulating fluid. The fluid coupling is characterized by a slip between the impeller element and the turbine element when power is transmitted from the driving shaft 5 to driven shaft 6. However, regardless of this slip, the torque input is always equal to the torque output.

When the engine or driving shaft 5 is rotating, the driven shaft 6 will also be rotating either as a result of the kinetic energy of the liquid or because of liquid drag, and since it is desirable under certain conditions (to be referred to later) to stop the driven shaft, such shaft is provided with the aforementioned brake B. This brake comprises a brake drum 13, secured to driven shaft 6 at a point adjacent the impeller element and cooperating with this drum is a pair of brake shoes 14 and 15 (Figures 2 and 3) positioned in end-to-end relation and having one of their pair of adjacent ends pivotally anchored to the fixed anchor pin 16 carried by housing 1. Brake shoe 15 has pivotally mounted adjacent its upper free end, a brake operating lever 17 which is connected by link 18 to the upper free end of brake shoe 14, the connection between the link and the shoe being of an adjustable type and comprising a nut 19 threaded upon the end of the link. A spring 20 maintains the end of shoe 14 against the adjusting nut and in order to permit easy adjustment, the nut extends to the exterior of the housing through a suitable opening (Figure 1). Brake shoe 14 and lever 17 are provided with suitable guides 21 carried by the housing and also with suitable adjustable stops 22 carried by the housing.

Driven shaft 6, in addition to being journaled in driving shaft 5 by means of collar 7, is also journaled in a secondary housing 23 by means of bearing 24, this secondary housing lying within the main housing 1 and being secured to gearing housing 2. The portion of the driven shaft which extends within the secondary housing has formed thereon a bell-shaped clutch member 25 provided with teeth 26 and pivoted within the end of the driven shaft and lying within the secondary housing is an intermediate shaft 27 which is the driving shaft of the change speed gearing D of well-known construction and need not be described in detail. This intermediate shaft 27 has splined thereon a slidable clutch member 28 provided with teeth 29 for interengagement with the teeth 26 on the bell-shaped clutch member 25. A shifting collar 30 is mounted on the slidable clutch member and receives in its groove 31 a shifting fork 32 secured to a vertically positioned cross shaft 33 journaled in the secondary housing 23 (Figure 2). The shiftable collar is normally biased toward the engaged position of the clutch by coil spring 34 which surrounds the intermediate shaft.

The clutch C is also provided with a synchronizing or balking means for preventing the clutch teeth from coming into contact until their speeds are substantially the same. This means is substantially identical to that shown in the prior application referred to and, briefly described, comprises a ring member 35 lying within the bell-shaped clutch member 25 and adapted to be driven by said clutch member in a clockwise direction only (looking from the left in Figure 1) by means of a one-way roller clutch connection 36. Also lying within the clutch member 25 and adjacent the ring member, is a balking ring 37 held in tight frictional engagement with ring 35 by means of an annular spring collar 38. The balking ring carries a plurality of spaced lugs 39 (one only being shown) adapted to project into openings 40 in the slidable clutch member 28 (see Figure 1A). Each lug 39 is provided with a stepped portion forming a shoulder 41 adapted to engage a portion of the inner surface of the clutch member 28 only when the latter is disengaged from the fixed clutch member 25.

It is desirable in the transmission system just described to operate the brake B and the positive clutch C in a definite timed sequence when the change speed gearing is disconnected from the engine and gear ratio changing performed. The control means should comprise a single operable member which, when operated, will first disengage the positive clutch and then apply the brake to thereby stop the turbine element of the coupling after the engine has been disconnected from the vehicle wheels. After the gear ratio has been changed it is highly desirable that the clutch be immediately released before the brake is disengaged. The purpose of this is to have the clutch teeth assume an out-of-contact position but ready to engage as soon as the shaft 6 thereof is rotated at a speed substantially equal to that of shaft 27 after the brake has been released. If the clutch is not released for engagement until after the brake has been released, serious damage to the clutch and the balking means may occur in the event the driving element of the clutch is rotated at a speed greater than the driven element prior to the driven element being permitted to assume a position allowing engagement.

In accordance with my invention I have designed a novel control means which will insure the proper time sequence of operation of the brake and clutch during gear changing operation. Referring specifically to Figures 2 and 3, the lower portion of housing 1 has slidably mounted therein a rod 42 provided with bearings 43 and 44. This rod 42 is positioned at right angles to the axes of the drum and the clutch and has its outer end provided with a slot 45 into which is adapted to extend the lower end of the brake operating lever 17. The open end of slot 45 is closed by a suitable block 46 held in the slot by bolt 47. This slotted end of the shaft extends out of the main housing and is enclosed by a removable cover 48, this cover being held in position by means of spring 49, one end of which is connected to the cover and the other end to brake lever 17. Spring 49 also functions to hold the brake lever against its stop 22 and the brake shoes in released position.

The lower end of the clutch operating shaft 33 has rigidly clamped thereto an arm 50, the clamping being accomplished by bolt 51 extending through the slit end of the arm. Loosely journaled on the lower end of shaft 33 is a second arm 52 of U-shaped formation carrying at its lower end a roller 53 journaled between the two legs of the arms by means of pin 54. This roller 53 is adapted to cooperate with a cam portion 55 formed by a recess in the longitudinally movable rod 42, the roller lying in the groove in the manner indicated in Figure 3 when the rod is in its normal inoperative position.

In order to connect arm 52 to arm 50 so that the movement of the former may be transmitted to the latter when the longitudinally movable rod 42 is moved, there is provided a connecting link 56 which is formed with a bifurcated end pivotally mounted on pin 54 of roller 53. The free end of connecting link 56 is provided with a cut-out portion 57 having at its lower end a tooth 58 adapted to cooperate with a V-shaped cut-out portion 59 in the end of arm 50 which, as previously stated, is secured to the clutch operating shaft 33. A coil spring 60 is interposed between the end of link 56 and shaft 33 biasing the connecting link 56 to a position where tooth 58 and recess 59 will interengage. A hairpin spring 61 is also provided between arms 50 and 52, tending to bias these arms away from each other.

The longitudinally movable rod 42 has its operable end extending into a cylinder 62 mounted on the side of the main housing 1 and its end secured to a piston 63 adapted for reciprocation in the cylinder. The piston and rod 42 are both biased to their inoperative positions, as viewed in Figure 5, by means of a coil spring 64 interposed between the end of cylinder 62 and the piston. The piston and cylinder together form a suction motor and are adapted to be operated from a suitable source of suction which, in the present instance, is the manifold of the internal combustion engine, the connection to the operating end of the cylinder being by means of conduit 65.

The operation of the suction motor is adapted to be governed by a suitable valve 66 which controls a passage 67 leading to the atmosphere through chamber 68 of the valve housing 68' and the atmospheric port 69. Valve 66 is connected to a valve operating rod 70 by means of a fingered member 71 positioned in the valve housing, the rod being positioned to one side of passage 67, as shown in Figure 4. The valve rod is adapted to be operated by means of a solenoid, the armature 72 thereof being directly connected to the valve rod and the coiled windings 73 are enclosed within a suitable casing 74 secured to the end of the suction motor cylinder 62 and the valve housing 68'. A suitable tension regulating device 72' is also provided on the armature for exterior adjustment to regulate the rapidity of the return movement of the armature when the solenoid is deenergized. The return movement of the armature, as well as the valve, is also assisted by a coil spring 75 surrounding valve rod 70 between the valve and the end of the valve casing. The valve rod has an extended portion 76 which projects into the main housing 1 and to a point adjacent the connecting mechanism between rod 42 and the clutch operating shaft 33. This extended portion 76 is provided with an annular shoulder 77 for cooperation with the end of connecting link 56 under certain conditions which will be hereinafter referred to. The solenoid for moving the valve rod and the valve is connected to a suitable source of electricity in a well-known manner, and may be controlled by a switch positioned at any desired point within reach of the operator of the vehicle. I prefer, however, that this switch be mounted on the gear shifting lever 78 of the change speed gearing D. This preferred arrangement is best shown in Figure 1 wherein switch 79 of the control circuit 79' is shown as mounted on the upper end of the gear shifting lever 80 and adjacent the knob 81 thereof and operable by means of a suitable lever 82 which can be controlled by the hand of the operator when it is placed upon the knob of the gear shifting lever to shift the gears of the gearing D.

Referring to the operation of my improved control mechanism, the normal position of the parts are shown in the several figures of the drawings and under these conditions the brake B is released and the clutch C engaged. The valve 66 is in a position where the air passage 67 is uncovered, causing the suction motor to be inoperative. The roller 53 on arm 52 lies in the cam recess 55 and the connecting link 56 between arms 52 and 50 is in a position to connect the two arms together. If the vehicle is stopped under these conditions and the change speed gearing is in neutral position, torque is being transmitted from the engine shaft through the hydraulic coupling and the clutch to the driving shaft 27 of the change speed gearing, but it is not being transmitted to the wheels of the vehicle because of the disconnected condition of the change speed gearing. Under these conditions if it is desired to start the vehicle, the operator will place his hand on the knob of the gear shift lever and, by means of his fingers, close the switch 79 with lever 82. The closing of the switch energizes the solenoid and as the result thereof, the armature 72 will be pulled to the left (Figure 3), thereby moving the valve 66 to a position wherein the passage 67 is closed. This closing of the valve also results in the extended portion 76 of the valve rod being moved to such a position that the shoulder 77 will be to the left of the top of the connecting link 56.

The closing of passage 67 cuts off communication with the atmosphere and as the result thereof the cylinder of the suction motor will be evacuated by its connection with the source of suction, thereby causing the piston 63 to be moved to the right, from its position as shown in Figure 3. The initial movement of the piston and the rod 42 connected thereto, causes the roller 53 to move out of the cam recess 55 and rotate the arm 52 in a counter-clockwise direction. Since the connecting link 56 is in a position to connect the arm 52 with arm 50 rigidly secured to the clutch shaft 33, arm 50 will also be rotated in a counter-clockwise direction, operating the shaft 33 and the shifting fork, thereby disengaging the clutch. The movement of arm 52 also positions the top of the connecting link 56 behind the shoulder 77 and in its path of movement. During this disengaging operation of the clutch, the brake will not be operated because of the lost motion connection between the rod 42 and the brake operating lever 17. However, as soon as the clutch is disengaged, the brake operating lever 17 will be engaged by block 46 in the end of slot 45 and rotated in a counter-clockwise direction (Figure 2). This movement of the brake lever will result in brake shoes 14 and 15 being forced into engagement with the drum 13, thereby stopping the turbine element of the hydraulic coupling. With the driving shaft 27 of the change speed gearing now disengaged from the fluid coupling and the turbine element of the fluid coupling held in an immovable position, the operator of the vehicle may engage the desired change speed ratio of the gearing by proper movement of the gear shift lever while continuing to maintain switch 79 closed.

With the proper gear engaged, switch 79 is released, thereby deenergizing the solenoid. As soon as the solenoid is deenergized, spring 75 on the valve rod 70 will immediately move said rod to the right, as shown in Figure 3, carrying with it shoulder 77 on extension 76. As the valve rod is shot rearwardly, or to the right, shoulder 77 will engage the connecting link 56 and pull tooth 58 out of the V-shaped cut-out portion 59. The connection between arms 50 and 52 is now broken and as the result thereof, the slidable clutch element 28 is free to be moved under the action of spring 34 to a position where its teeth 29 will interengage with teeth 26 of the cooperating clutch element 25. The balking ring 37 will have no effect on the reengaging operation of the clutch under the above conditions because both of the clutch elements 25 and 28 are not rotating when the clutch is disenagaged and reengaged and, therefore, the balking ring is not shifted so that its shoulder 41 will hold the teeth out of contact.

The above operation takes place immediately upon the deenergizing of the solenoid and prior to release of the brake, as this action is considerably more rapid than the releasing movement of the piston of the suction motor. The tripping of the connecting link 56 takes place immediately at the beginning of the return of the valve rod and prior to the movement of valve 66 to a position uncovering the atmospheric passage 67. When this passage is uncovered, air will be admitted to the suction motor, thereby breaking the partial vacuum and permitting spring 64 to return the piston to its retracted position. The return of the piston results in the brake being released by the action of the brake releasing spring 49. When the piston 63 of the suction motor is returned to its retracted position the roller 53 will again move into the cam recess 55 under the action of the hairpin spring 61 This will result in the connecting link 56 being moved downwardly to a position where spring 60 may again cause the tooth 58 to engage in the V-shaped cut-out portion 59 so that arms 52 and 50 are interconnected for subsequent disengagement of the clutch when rod 42 is again moved longitudinally to the left. With the brake released, the clutch engaged, and the gearing connected, the vehicle may be driven through the fluid coupling, and the selected gear ratio.

If, after starting the vehicle it is desired to change the speed ratio, the operator will place his hand on the gear shift lever knob and again close the switch, thereby energizing the solenoid and causing the same cycles of operation to take place as already described, that is, the suction motor will be operated to initially disengage the clutch and subsequently apply the brake. When the gear shift has been made, the slidable clutch element will be rotating as it is now connected with the propellor shaft which is being rotated by the moving vehicle. Due to the disengaging movement of the clutch element 28, the finger 29 of the balking ring 37 is withdrawn from the opening 40 sufficiently to place the shoulder 41 outside the opening. This permits the balking ring and the clutch element to have slight relative movement which will place the shoulder 41 in a position to be engaged by the clutch element when released. Now when the solenoid is deenergized by opening the switch 79, the clutch will be immediately released by the tripping of connecting link 56 and disconnecting arm 52 from arm 50, but the teeth of the clutch elements will be held out of contact and prevented from interengaging by the balking ring. Release of the brake by movement of the suction motor piston to its retracted position will result in rotation of the turbine element and the clutch element 25. When clutch element 25 is rotated at a speed slightly greater than that of clutch element 28, the balking ring will be picked up by the one-way roller connection 36 and rotated to a position where shoulder 41 will be moved out of the path of clutch element 28, thereby permitting teeth 29 of the slidable clutch element to engage teeth 26 of the clutch element 25 under the action of engaging spring 34. With the clutch engaged, power can now be transmitted to the wheels of the vehicle through the selected gear ratio. If subsequent gear ratio changes are desired, the operation is again repeated by energizing the solenoid, changing the gear ratio, and then deenergizing the solenoid.

From the foregoing description of my invention it is readily seen that I have devised a very compact control mechanism for the transmission system with which it is employed. The wear of the brake will have no effect on the timed operation of the clutch. The clutch is always released immediately upon de-energization of the solenoid notwithstanding the fact that the longitudinally movable brake operating rod 42 may move one inch or three inches to apply the brake. Also, the control mechanism and the brake are so arranged that the brake is applied by a direct pull. The solenoid operated control means eliminates the necessity of any pedals and, therefore, there is no problem present in assembling the transmission system and the novel control means to the chassis of a vehicle.

Being aware of the possibility of modifications in the particular structures herein described, without departing from the fundamental principles of my invention, I do not intend that its scope be limited except as set forth in the appended claims.

Having fully described my invention, what I claim as new and desire to secure by Letters Patent of the United States is:

1. In transmission mechanism, a driving shaft, a driven shaft, a hydraulic power transmitter of the kinetic type interposed between the shafts and comprising an impeller element and a turbine element, a brake associated with the power transmitter, a third shaft, a clutch comprising relatively movable elements for connecting and disconnecting said third shaft from the driven shaft, means for applying the brake, means operable by the brake applying means for disengaging the clutch prior to application of the brake, and means, operable upon initial release of said brake applying means for disconnecting the clutch disengaging means from the brake applying means, to permit the clutch to assume a position permitting engagement upon occurrence of substantial synchronism of its elements.

2. In transmission mechanism, a driving shaft, a driven shaft, a hydraulic power transmitter of the kinetic type interposed between the shafts and comprising an impeller element and a turbine element, a brake associated with the power transmitter, a third shaft, a clutch comprising relatively movable elements for connecting and disconnecting said third shaft from the driven shaft, a longitudinally movable rod connected to the brake, power means for moving said rod, a connection between the rod and the clutch for disengaging the clutch prior to application of the brake, means for disabling said connection, and means governed by the initial release of the power means for operating said disabling means and allowing the clutch elements to assume a position permitting their reengagement prior to full release of the brake.

3. In transmission mechanism, a driving shaft, a driven shaft, a hydraulic power transmitter of the kinetic type interposed between the shaft comprising an impeller element and a turbine element, a propeller shaft, a brake associated with the power transmitter, a clutch for disconnecting the driven shaft from the propeller shaft and comprising relatively movable engageable elements and balking means preventing their reengagement until the speeds thereof are substantially synchronized, control means for disengaging the clutch elements and then applying the brake, said control means embodying means, operable upon initial movement of said control means to release the brake, for disconnecting the clutch from the control means to permit the clutch elements to be governed by their balking means prior to full release of the brake.

4. In transmission mechanism, a driving shaft, a driven shaft, a hydraulic power transmitter of the kinetic type interposed between the shafts and comprising an impeller element and a turbine element, a brake associated with the power transmitter, a third shaft, a clutch comprising relatively movable engageable elements for connecting and disconnecting said third shaft from the driven shaft, power-operated means for applying the brake, means operable by the power-operated brake applying means for disengaging the clutch elements prior to the application of the brake and comprising a disconnectable connection, a solenoid for controlling the power-operated means, and means, operable when the solenoid is deenergized to cause the power means to release the brake, for operating said disconnectable connection to free the clutch from the power means and permitting the clutch elements to assume a position allowing its reengagement when the elements thereof are substantially synchronized.

5. In transmission mechanism, a driving shaft, a driven shaft, a hydraulic power transmitter of the kinetic type interposed between the shafts comprising an impeller element and a turbine element, a propeller shaft, a brake associated with the power transmitter, a clutch for disconnecting the driven shaft from the propeller shaft and comprising relatively movable engageable elements, a longitudinally movable rod operable to apply the brake, control means for moving said rod longitudinally, means operable by the longitudinal movement of said rod and prior to the application of the brake for disengaging the clutch elements, and means interconnecting the control means and the clutch operating means for permitting the clutch elements to assume a position allowing engagement thereof upon initial release of the control means and prior to full release of the brake.

6. In transmission mechanism, a driving shaft, a driven shaft, a hydraulic power transmitter of the kinetic type interposed between the shafts comprising an impeller element and a turbine element, a propeller shaft, a brake associated with the power transmitter, a clutch for disconnecting the driven shaft from the propeller shaft and comprising relatively movable engageable elements, a longitudinally movable rod operable to apply the brake, control means for moving said rod longitudinally, a lever connected for operating the clutch, cam means for moving the lever to disconnect the elements of the clutch upon the initial movement of the rod to apply the brake, and means, operable by the control means when said control means is operated to initially release the brake, for disconnecting the lever from the clutch and permitting it to assume a position allowing its reengagement when the elements thereof are substantially synchronized.

7. In transmission mechanism, a driving shaft, a driven shaft, a hydraulic power transmitter of the kinetic type interposed between the shafts and comprising an impeller element and a turbine element, a brake associated with the power transmitter, a propeller shaft, a positive clutch comprising relatively movable interengageable elements for connecting and disconnecting said propeller shaft from the driven shaft, a longitudinally movable rod connected to the brake, a fluid motor for moving said rod longitudinally to apply said brake, a connection between the rod and the clutch for disengaging the clutch prior to application of the brake, means for disabling said connection, a valve for the fluid motor, a solenoid for operating the valve to cause the fluid motor to operate the rod and including an electrical circuit and a switch, and means governed by the deenergizing of the solenoid to permit the valve to cause the fluid motor to release the brake, for operating said disabling means and permitting the clutch elements to assume an engaged position prior to full release of the brake.

8. In transmission mechanism, a driving shaft, a driven shaft, a hydraulic power transmitter of the kinetic type interposed between the shafts and comprising an impeller element and a turbine element, a brake associated with the power transmitter, a propeller shaft, a positive clutch comprising relatively movable interengageable elements for connecting and disconnecting said propeller shaft from the driven shaft, a longitudinally movable rod connected to the brake, a shaft for operating the clutch, an arm secured to the shaft, a second arm pivotally mounted on said shaft and operatively connected for rotative movement by the longitudinally movable rod, a disconnectable connection between said arms, means for moving said rod to simultaneously move said arms to disengage the clutch and then apply the brake, control means for said last named means, and means for disconnecting said arms and freeing the clutch for reengagement prior to full release of the brake, said means being operable by the control means.

9. In transmission mechanism, a driving shaft, a driven shaft, a hydraulic power transmitter of the kinetic type interposed between the shafts and comprising an impeller element and a turbine element, a brake associated with the power transmitter, a propeller shaft, a positive clutch comprising relatively movable interengageable elements for connecting and disconnecting said propeller shaft from the driven shaft, a longitudinally movable rod connected to the brake, a shaft for operating the clutch, an arm secured to the shaft, a second arm pivotally mounted on said shaft and operatively connected for rotative movement by the longitudinally movable rod, a disconnectable connection between said arms, power means for moving said rod to simultaneously move said arms to disengage the clutch and then apply the brake, a solenoid and electrical circuit for causing said power means to be operative, and means operable by the deenergizing of said solenoid for disconnecting said arms and freeing the clutch for reengagement prior to full release of the brake.

WERNER F. BOLDT.